United States Patent [19]

Zankl

[11] 4,293,263
[45] Oct. 6, 1981

[54] SCREW LOCK RIVET

[76] Inventor: Robert H. Zankl, 5410 Banyan Dr., Miami, Fla. 33156

[21] Appl. No.: 97,522

[22] Filed: Nov. 26, 1979

[51] Int. Cl.³ .............................................. F16B 19/04
[52] U.S. Cl. ................................. 411/500; 24/221 R
[58] Field of Search ............... 85/5 P, 37; 24/73 RM, 24/221 R, 221 A, 221 K

[56] References Cited

U.S. PATENT DOCUMENTS

| 1,091,849 | 3/1914 | King .................................. 24/221 K |
| 1,303,770 | 5/1919 | Carr .................................... 24/221 R |
| 2,120,530 | 6/1938 | Shippee et al. .................... 24/221 A |
| 2,285,661 | 6/1942 | Hryzak ............................... 24/221 A |
| 2,445,009 | 7/1948 | Straus et al. .................. 24/221 R X |
| 2,593,064 | 4/1952 | Silberman ............................... 85/5 R |
| 2,728,259 | 12/1955 | Poupitch ....................... 24/221 K X |
| 2,826,388 | 3/1958 | Janos et al. ....................... 85/5 P X |
| 3,304,681 | 2/1967 | Wunderlich .................... 24/73 RM |
| 3,540,088 | 11/1970 | Simpson et al. ................... 24/221 K |
| 4,007,516 | 2/1977 | Coules .............................. 24/221 R |

FOREIGN PATENT DOCUMENTS

| 969000 | 5/1950 | France ................................... 85/5 P |
| 629937 | 9/1949 | United Kingdom ............. 24/221 A |
| 1249646 | 10/1971 | United Kingdom ................... 85/5 P |
| 1256295 | 12/1971 | United Kingdom ............. 24/221 R |

Primary Examiner—Thomas J. Holko
Attorney, Agent, or Firm—Ernest H. Schmidt

[57] ABSTRACT

A screw lock rivet for use in adjustably securing a riveted member to a companion member, such as a supporting bracket, has a rivet shank portion for pre-riveting to the member to be attached, and an integrally formed head terminating in a nut portion, the underside of which head is formed with diametrically-opposed, axially outwardly-projecting arcuate elevating ramp portions and a central shank base portion ovoid in transverse cross-sectional shape and coaxial with the rivet schank portion. The bracket or other companion member to be adjustably attached to is provided with an elongated adjustment slot communicating with an enlarged opening for reception of the rivet head and to permit the sliding therealong of the screw lock rivet shank portion, the relative dimensions between the bracket slot width and thickness, and the size and shape of the rivet shank base portion, being such that upon turning of the screw lock rivet, the elevating ramp portion will be constrained to clampingly ride up upon surface portions of the bracket adjacent to the slot, while at the same time causing radially increasing peripheral arcuate wall portions of the ovoid shank base portion to wedge transversely within the slot at an adjusted position therealong.

4 Claims, 7 Drawing Figures

U.S. Patent
Oct. 6, 1981
4,293,263
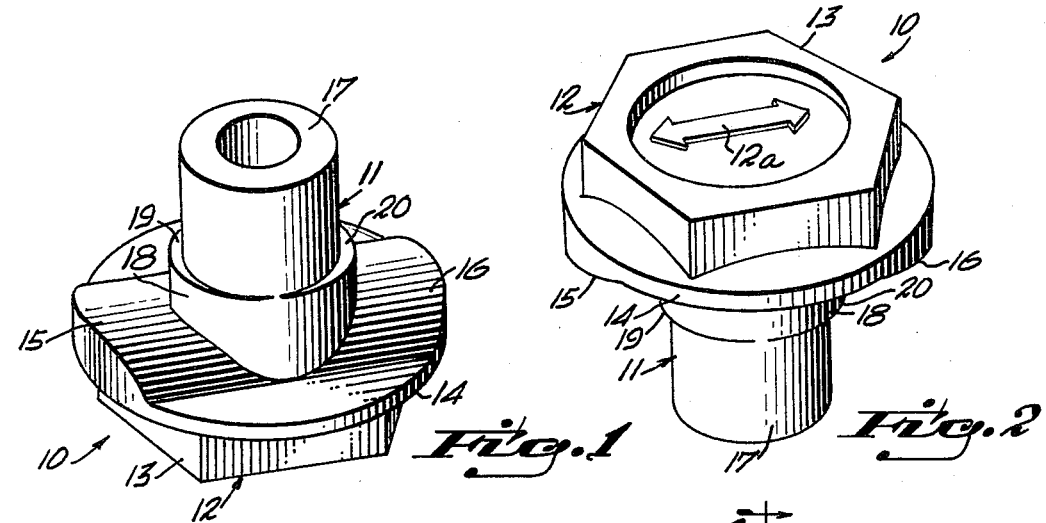
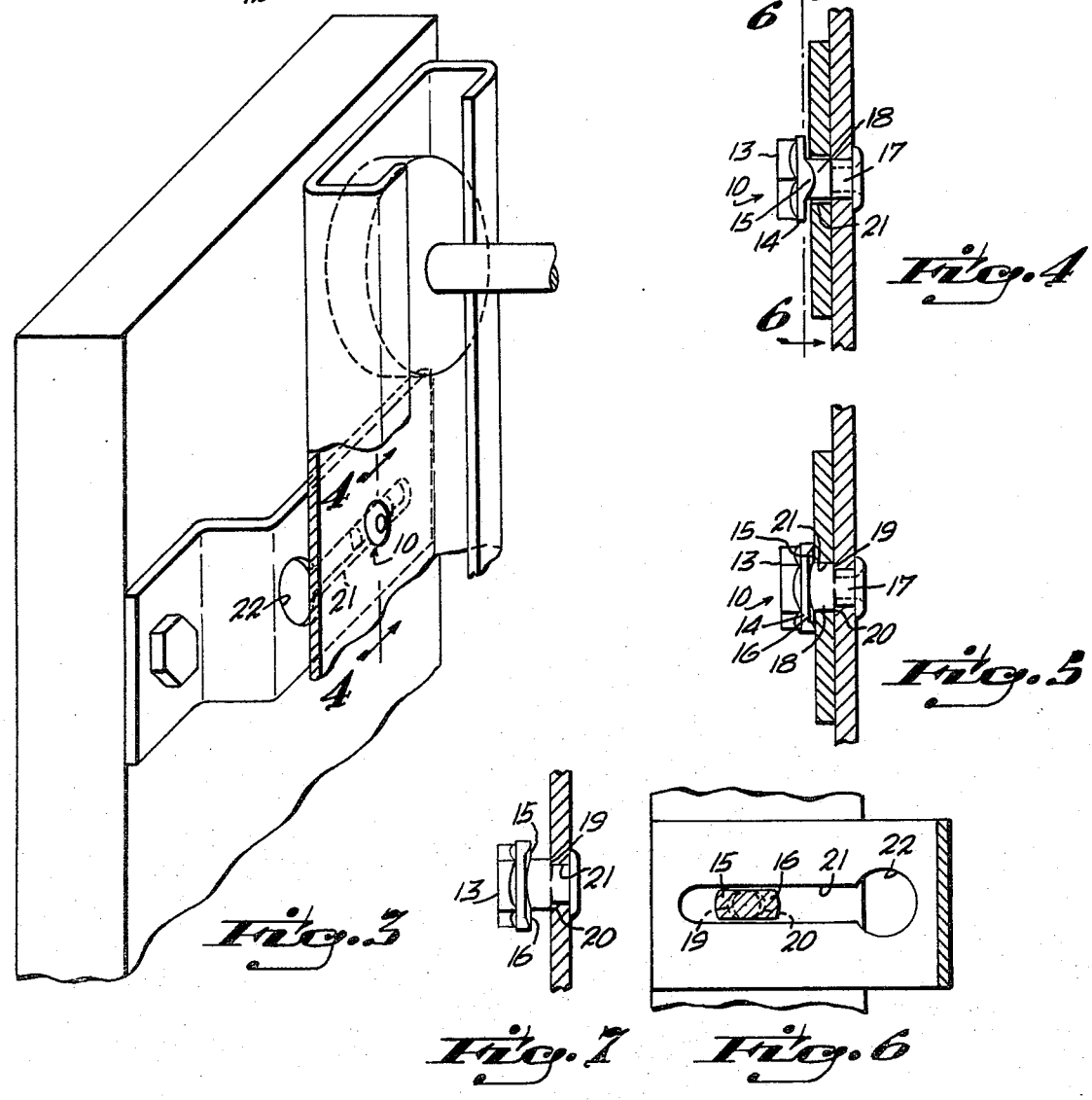

SCREW LOCK RIVET

BACKGROUND OF THE INVENTION

This invention relates to metal parts assembly rivets, and is directed particularly to a screw lock rivet for sheet metal parts, including a rivet portion for riveting to one member of a pair of companion work-pieces to be assembled, and a screw lock portion adapted to be received in an adjustment slot of the other work-piece to enable positionally adjusted attachement thereto in the field simply by turning the rivet head portion approximately 90 circular degrees with use of a socket wrench or the like. Rivets, nuts and bolts, and sheet metal screws are commonly used in the assembly of sheet metal parts. Ordinarily, if assembly is completed at the factory and subsequent disassembly during use is not anticipated, rivets will be used because of their low cost, ease of installation with power tools, effectiveness, and durability. Where sheet metal or metal plate parts or work-pieces are only partially assembled at the factory, to be adjustably assembled to one another in the field during installation, nuts and bolts are most often used. For example, in the installation of prefabricated roller guide tracks for overhead sliding garage doors, upon installation in the field the roller guide tracks are usually bolted to support brackets attached to the garage door frame-work. In such instances, to provide for positional adjustment of the roller guide tracks, the bolt openings in the supporting brackets are elongated or in the form of a slot. The use of field assembly nuts and bolts for such purposes is not only tedious and expensive as compared to the cost of riveting, but also entails the use of loose nuts and bolts that must be separately accounted for during shipment and installation.

SUMMARY OF THE INVENTION

It is, accordingly, the principal object of this invention to obviate these deficiences of nut and bolt assembly in the field of partially prefabricated sheet or plate metal work-pieces or structures by combining, in a rivet structure adapted to be pre-riveted to one of the work-pieces to be assembled in the field, screw-turn actuated mechanism operative to move the rivet into clamping and wedging attachment with respect to the other work-piece.

A more particular object of the invention is to provide a screw lock rivet of the character described having a rivet shank portion for preriveting to the member to be attached, and an integrally-formed head terminating in a hexagonal nut portion the other side which is provided with diametrically-opposed, axially outwardly-projecting, arcuate elevating ramp portions, and a central shank base portion ovoid in transverse, cross-sectional shape and coaxial with the rivet shank portion. The bracket or other companion member to be adjustably attached to is provided with an elongated adjustment slot communicating with an enlarged opening for the reception of the rivet head and to provide for the sliding therealong of the screw lock rivet shank portion, the relative dimensions between the bracket slot width, and the size and shape of the rivet shank base portion, being such that upon turning of the screw lock rivet by approximately 90 circular degrees, the elevated ramp portion is constrained to clampingly rise up upon surface portions of the bracket adjacent to the slot, while at the same time causing radially-increasing peripheral arcuate wall portions of the ovoid shank base portion to wedge transversely within the slot at an adjusted position therealong.

Yet another object of the invention is to provide the screw lock rivet for adjustably securing together sheet metal or plate metal members in the field, and combining structural and economic advantages of riveting with the simplicity of adjustable screw lock inter-assembly in the field.

Other objects, features and advantages of the invention will be apparent from the following description when read with reference to the accompanying drawings.

BRIEF DESCRIPTION OF THE DRAWING

In the drawings, wherein like reference numerals denote corresponding parts throughout the several views:

FIG. 1 is an oblique view of the underside of a screw lock rivet embodying the invention;

FIG. 2 is an oblique view of the top thereof;

FIG. 3 illustrates, by way of example, use of the screw lock rivet in the adjustable securement of a garage door roller guide rail or track to its supporting brackets;

FIG. 4 is a transverse cross-sectional view taken along the line 4—4 of FIG. 3 in the direction of the arrows and illustrating the rotative position of the screw lock rivet before its securement to the supporting bracket;

FIG. 5 is a cross-sectional view similar to FIG. 4, but illustrating the screw lock rivet in locked position after positional adjustment along the supporting bracket slot;

FIG. 6 is a cross-sectional view of the screw lock riveted assembly, taken along the line 6—6 of FIG. 4 in the direction of the arrows and illustrating details of the rivet locking mechanism; and FIG. 7 is a cross-sectional view similar to that of FIG. 5 but showing the riveted member before assembly to the member to be attached to.

DESCRIPTION OF THE PREFERRED EMBODIMENT

Referring now in detail to the drawings, FIGS. 1 and 2 illustrate a preferred form of screw lock rivet embodying the invention, designated generally by reference numeral 10. The screw lock rivet 10 is integrally formed with a shank 11 and head 12. The rivet head 12 comprises a hexagonal nut portion 13 the underside of which merges with a coaxial, circular flange portion 14. As best illustrated in FIG. 1, the underside of head flange portion 14 is partially flat, the flat portions lying in a plane perpendicular with the longitudinal axis of the rivet. The underside of the rivet flange portion 14 is also formed with diametrically-opposed, axially outwardly-projecting, rounded or arcuate elevating ramp portions 15 and 16 which merge at their inner ends with the flat portions thereof.

The integral rivet shank 11 comprises a tubular outer end portion 17 which projects, at its inner end, from a shank base portion 18 which is ovoid in its transverse cross-section, with the major axis lying along the same diameter as that of elevating ramp portions 15 and 16. In this connection, it is to be noted that the minor axis or the ovoid rivet base portion 18 will preferably be the same as the diameter of the cylindrical outer rivet end portion 17. Although the rivet shank outer end portion 17 is described and illustrated herein as being tubular, it could as well be of solid cylindrical shape for riveting purposes.

In use, one or more of the screw lock rivets 10 will be riveted in place in openings provided along the member to be adjustably attached to the supporting bracket or the like. Thus, as best illustrated in FIG. 7, a lock screw rivet is first riveted in place againt the arcuate shoulder portions 19, 20 at the base of outer end portion 17 of the rivet shank 11. This can be done automatically at the factory, for example, to simplify subsequent assembly and installation in the field or at the site of use. When applied to use in the fabrication and installation of roller guide tracks for overhead sliding doors, as illustrated herein by way of example, the brackets or other members to which the rivet supporting members are to be attached are formed with elongated slots 21 having at one end a circular rivet head entry opening 22. It is to be particularly noted that the width of the adjusting slot 21 is just sufficient to pass the shank base portion 18 of a screw lock rivet when the major axis thereof lies along the length of the slot and that the arcuate extent of the axially outwardly-projecting arcuate ramp portion about the rivet axis is no greater than the maximum diameter of the shank portion. In other words, the slot is just wide enough to pass the tubular outer end of the rivet, so that the arcuate elevating ramp portions 15,16 at the time of insertion, will necessarily lie along the length of the slot. This can readily be determined by reference to the parallel-extending diagonal arrow 12a impressed upon the outer face of the rivet head 12 (see FIG. 2).

The minimum length of the shank base portion 18, that is, the length between the outer end of arcuate shoulder portions 19, 20 thereof and the elevating ramp portions 15,16 at their zones of maximum height, will be only slightly less than the thickness of the companion bracket to be adjustably attached to. After thus having assembled the rivet supporting member in place with respect to its bracket or other companion member, it can readily be slidingly adjusted along slot 21 to the desired position. Locking in place is effected simply by use of a socket wrench or the like tool applied to the hexagonal portion 13 of the screw lock rivet 10, and turning the rivet through an angle of approximately 90 circular degrees.

As described above, the relative dimensions between the bracket slot width and thickness, and the size and shape of the screw lock rivet shank base portion 18, are such that, upon turning the screw lock rivet, the elevating ramp portions 15, 16 will be constrained to ride up upon the surface portions of the bracket adjacent to the slot, serving to clamp the member to be attached and its supporting bracket member together, while at the same time causing arcuate shoulder portions 19, 20 of the shank base portion 18 to wedge transversely within the slot at the adjusted position. In this connection, it is to be noted that the above-described clamping and wedging action results in a twisting or screw-like seizure of the shank base portion 18 of the screw lock rivet within slot 21, thereby enhancing the strength of the interconnection.

While I have illustrated and described herein only one form in which my invention can conveniently be embodied in practice, it is to be understood that this form is presented by way of example only and not in a limiting sense. My invention, in brief, comprises all the embodiments and modifications coming within the scope and spirit of the following claims.

What I claim as new and desire to secure by Letters Patent is:

1. In a screw lock rivet for use in adjustably securing a riveted member to a sheet metal companion member having an adjustment slot and an opening communicating with the adjustment slot for admitting a screw lock rivet head, the combination with said sheet metal companion member of a rivet head, a rivet shank integrally formed with and extending axially outwardly of the underside of said rivet head, said underside of said head being formed with a flange comprising a flat, transversely-extending portion and an axially outwardly-projecting arcuate ramp portion, said shank comprising a shank base portion extending into a cylindrical shank outer end portion of decreased cross-sectional size to define with said shank base portion a shoulder against which a member to be riveted to seats upon the riveting deformation of said shank outer end portion, the axial distance between the outward-most projection zone of said ramp portion and said shoulder being less than the thickness of the companion member to be riveted to, and tool engaging means at the outer end of said rivet head to facilitate turning of the lock screw rivet with respect to a companion member to be riveted to, said shank base portion being ovoid in transverse cross-sectional shape, the arcuate extent of said axially outwardly-projecting arcuate ramp portion being no greater than the maximum diameter of said shank portion, the major axis of said ovoid shank portion and the radial direction of said arcuate ramp portion lying along the same transverse diameter as that of said cylindrical shank outer end portion, said major axis having a length greater than the width of the companion member adjustment slot.

2. A screw lock rivet as defined in claim 1 wherein said outwardly-projecting arcuate ramp portion comprises a pair of substantially identical, diametrically opposed ramp members.

3. A screw lock rivet as defined in claim 2 wherein said tool engaging means comprises a hexagonal nut portion.

4. A screw lock rivet as defined in claim 3 including means at the outer end of said rivet head for indicating the diametrical direction of said opposed ramp members.

* * * * *